Patented Aug. 8, 1933

1,921,370

UNITED STATES PATENT OFFICE 1,921,370

METHOD OF MAKING PHOSPHORUS OXYCHLORIDE

Clayton Olin North, Nitro, W. Va., assignor to Kavalco Products, Inc., Nitro, W. Va., a Corporation of West Virginia No Drawing. Application January 12, 1933
Serial No. 651,368

10 Claims. (Cl. 23—203)

This invention relates to a method of making phosphorus oxychloride.

One object of my invention is the provision of a method whereby phosphorus oxychloride may be made without the objectionable features inherent in methods previously used.

Another object of this invention is the provision of a method for making phosphorus oxychloride by oxidizing phosphorus trichloride in the presence of chlorine gas.

Other objects will be in part obvious and in part pointed out hereinafter.

Phosphorus oxychloride is a widely used reagent for many organic condensation reactions and finds particular application in the preparation of triphenyl and tricresyl phosphates, both of which are used as plasticizers for cellulose acetate, cellulose nitrate and for various resins. Tricresyl phosphate has also been proposed for use in electrical insulation, waterproofing of shellac and the like.

Phosphorus oxychloride is prepared by the oxidation of phosphorus trichloride ($PCl_3$). The old method which is still used by some manufacturers carries out this oxidation by means of sodium chlorate ($NaClO_3$). The reaction which takes place is as follows:

$$3PCl_3 + NaClO_3 = 3POCl_3 + NaCl.$$

This method gives a very nice grade of phosphorus oxychloride, but there are certain economic factors which render the method expensive.

In the first place the sodium chloride produced by the reaction always holds some phosphorus oxychloride and since the sodium chloride must be removed at stated intervals there is a loss of the oxychloride. Also the sodium chloride cakes readily and a powerful stirrer is required to prevent such caking. There is considerable abrasion and the apparatus does not last very long. Furthermore, the removal of the sodium chloride is a very unpleasant operation which must be performed by operators wearing gas masks, as phosphorus oxychloride fumes produce intense lung and throat irritation.

It has been known for some time that phosphorus pentachloride and phosphorus pentoxide react and yield phosphorus oxychloride according to the following reactions:

$$P_2O_5 + 3PCl_5 = 5POCl_3.$$

This reaction goes very nicely but unfortunately the main difficulty is in the preparation and handling of phosphorus pentachloride. The material is a solid and is exceedingly corrosive and hard to handle. Also it is quite difficult to make.

My preferred method is to oxidize phosphorus trichloride by adding chlorine thereto in the presence of an oxygen bearing compound. To accomplish this result I mix phosphorus trichloride and phosphorus pentoxide in the proper proportions. No reaction occurs until chlorine is passed in. After the proper quantity of chlorine has been added, the reaction is completed. This reaction goes forward as follows:

$$3PCl_3 + P_2O_5 + 3Cl_2 = 5POCl_3.$$

The phosphorus trichloride is easily handled since it is a liquid and the chlorine can be fed in from weighed cylinders so that the whole operation is under very close control.

The following examples are given to set out how the method may be carried out, but it is to be expressly understood that I am not restricted to the exact proportions and specified conditions.

*Example No. 1.*—Three molecular quantities, namely, 412.5 parts by weight of phosphorus trichloride were placed in a receptacle and 156.2 parts by weight of phosphorus pentoxide were added. The receptacle was provided with a stirrer, a chlorine inlet and a reflux condenser. Means for heating the receptacle was provided. The introduction of chlorine was begun and the receptacle slowly heated by means of a water bath to about 76° C. The chlorine was absorbed by the mixture. During the reaction, the temperature was slowly raised. When approximately two-thirds of the proper quantity of chlorine was added the refluxing temperature was about 96° C. During the reaction the mixture is stirred. When all the chlorine was in, the refluxing temperature was about 107° C. The amount of chlorine charged was 206.4 parts by weight. The weight of the crude reaction mixture was about 767 parts by weight. The time of the reaction was about 171 minutes. The crude reaction mixture was then fractionated. The first fraction, boiling between 101 and 106° C., was about 15 parts by weight. The main fraction boiled between 106 and 107.5° C. and was about 626 parts by weight. The crystallizing point of the main fraction was +.7° C.

*Example No. 2.*—The charge of this example contained 142 parts by weight of phosphorus pentoxide and 453.7 parts by weight of phosphorus trichloride. It will be noted that in these proportions there is an excess of 10% of phosphorus trichloride. The chlorine charged in was about 198.4 parts by weight and the time required for the reaction was about 172 minutes. The yield of crude material was about 807.5 parts by weight. The first fraction which boiled between 88 and 105° C. contained about 126.5 parts by weight. The main fraction boiling between 105 and 108.5° C. was about 634 parts by weight. There was a small residue in the reaction receptacle. Analysis of the first fraction showed it to be about 13.2% phosphorus trichloride and the balance phosphorus oxychloride.

One form of kettle or receptacle which may be used is a lead lined one having coils for heating or cooling the reaction mass. The kettle is also equipped with a reflux condenser and a stirrer. Another charge which may be used consists of about 726 parts by weight of phosphorus trichloride and about 250 parts by weight of phosphorus pentoxide. The kettle is charged cold, and the lid is clamped on. The temperature is raised to about 60° C. and is gradually increased to about 90° C. as the reaction proceeds. The mixture is stirred to insure uniform heating and thorough mixing. Chlorine is fed in from weighed cylinders, the usual quantity required is about 375 parts by weight. It takes about five hours to complete the reaction. When the reaction is over, which is indicated by the color of the refluxing liquid becoming yellow, the charge is dropped into an enamelled still which is equipped with a column and reflux condenser, and distillation is carried out in the usual manner, employing a still, column, reflux condenser and condenser. The excess phosphorus trichloride is first distilled off and then the phosphorus oxychloride is distilled. This gives a very high grade material containing a very small percentage of phosphorus trichloride. Ordinarily a yield of about 1350 parts by weight of hosphorus oxychloride is obtained from this charge.

While specific examples have been above given, it is to be expressly understood that variations of the proportions and conditions within limits are permissible and come within the scope of the invention disclosed.

What I claim is:

1. A method of the character described, which comprises mixing phosphorus trichloride and phosphorus pentoxide and then introducing a gas containing chlorine.

2. A method of the character described, which comprises adding a chlorine gas to a mixture of phosphorus trichloride and phosphorus pentoxide.

3. A method of the character described, which comprises adding a chlorine gas to a mixture of phosphorus trichloride and phosphorus pentoxide and heating the mixture while adding the chlorine gas.

4. A method of the character described, which comprises adding a chlorine gas to a mixture of phosphorus trichloride and phosphorus pentoxide and raising the temperature of the mass while adding the chlorine gas.

5. A method of making phosphorus oxychloride, which comprises, adding chlorine to phosphorus trichloride and phosphorus pentoxide, heating the mass and adding chlorine until the reaction is complete.

6. A method of the character described, which comprises, adding a chlorine containing gas to phosphorus trichloride and phosphorus pentoxide, raising the temperature of the mass while adding more chlorine containing gas until the reaction is complete.

7. A method of the character described, which comprises, reacting phosphorus trichloride, phosphorus pentoxide and chlorine to form phosphorus oxychloride, and then distilling to separate phosphorus oxychloride.

8. A method of the character described, which comprises, reacting phosphorus trichloride, phosphorus pentoxide and chlorine to form phosphorus oxychloride.

9. A method of the character described, which comprises, adding chlorine to phosphorus trichloride and phosphorus pentoxide, adding more chlorine and raising the temperature of the mass to approximately 100° C.

10. A method of the character described, which comprises, adding chlorine to phosphorus trichloride and phosphorus pentoxide, stirring the mixture, raising the temperature of the mixture while adding more chlorine.

CLAYTON OLIN NORTH.